S. M. McDANIEL.
TRAP.
APPLICATION FILED SEPT. 16, 1910.
1,002,925.
Patented Sept. 12, 1911.
2 SHEETS—SHEET 1.
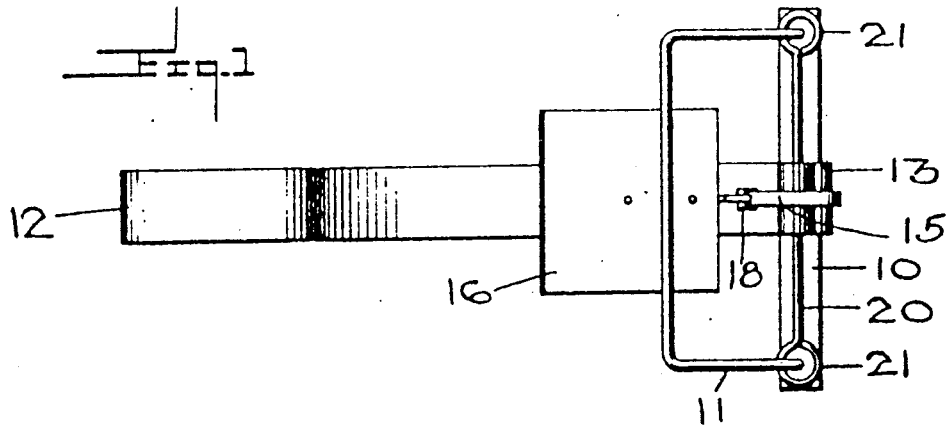
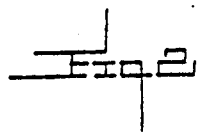
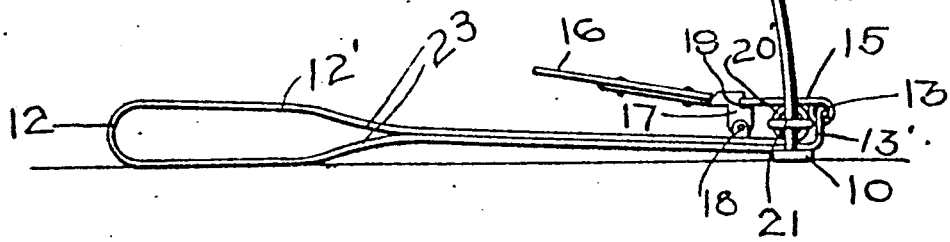
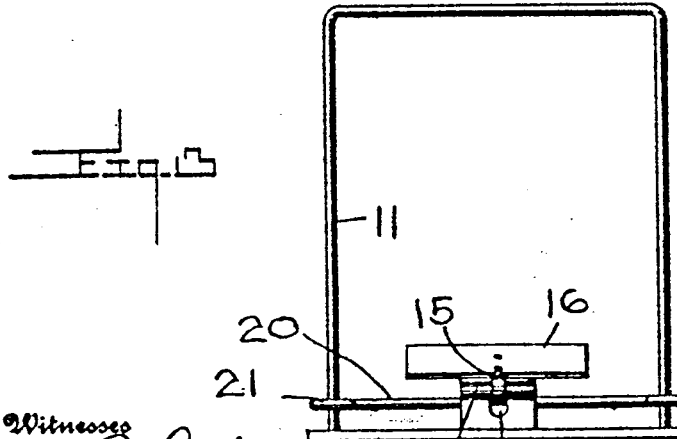
Witnesses
Ed. R. Lusby
R. E. Martino
Inventor
S. M. McDaniel
By Horace L. Woodward
Attorney

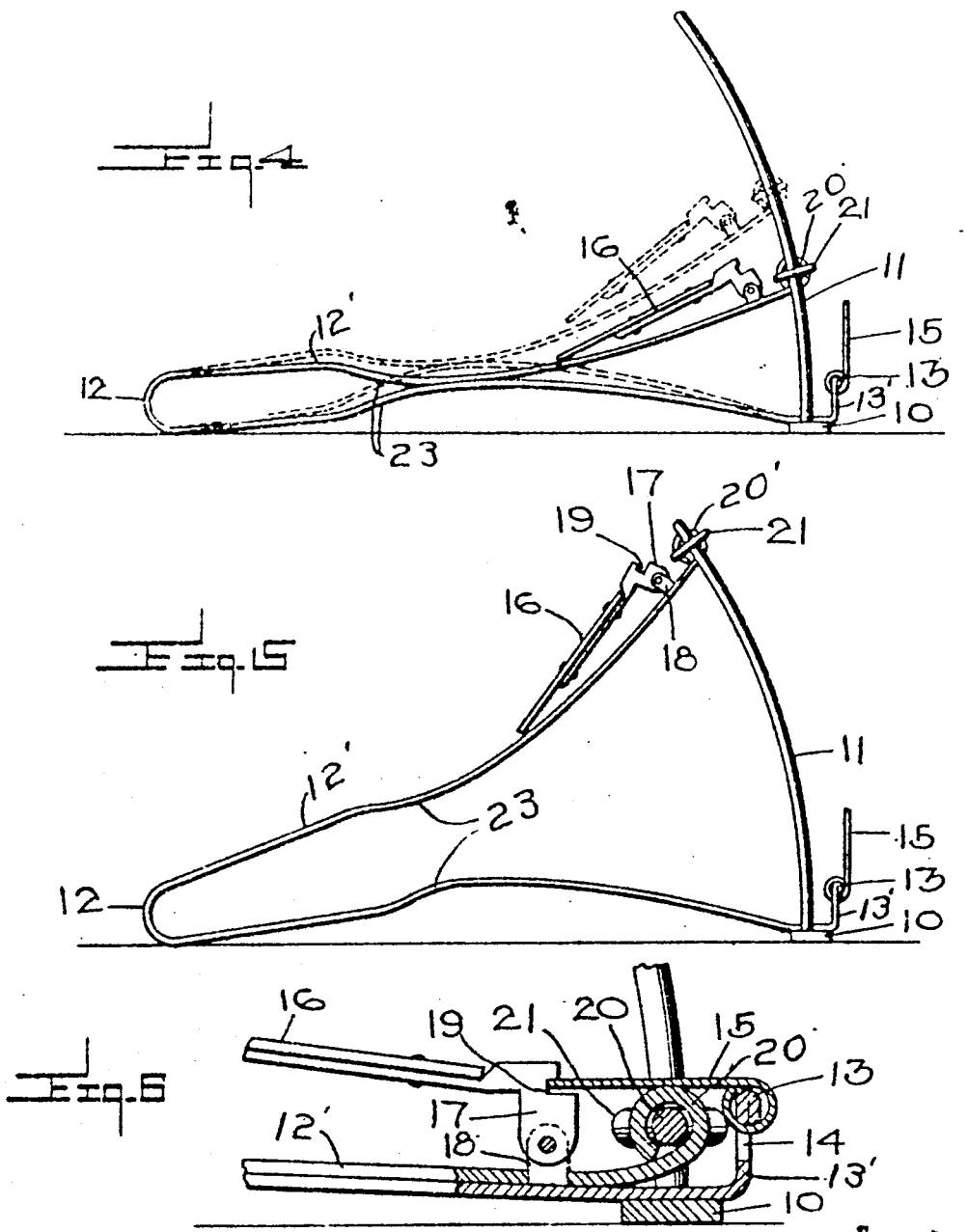

1,002,925. TRAP. SANFIELD M. MCDANIEL, Granada, Minn. Filed Sept. 16, 1910. Serial No. 582,398.

*To all whom it may concern:*

Be it known that I, SANFIELD M. MCDANIEL, a citizen of the United States, residing at Granada, in the county of Martin and State of Minnesota, have invented certain new and useful Improvements in Traps, of which the following is a specification.

This invention relates to traps, and more particularly to that type known as "chokers," and has for an object to provide such a device operative upon animals approaching from either of two directions, by the use of a single spring, bail and choker bar.

An important object is to reduce the expense of manufacture of such devices and eliminate much of the complexity of construction and operation found in prior traps of the type. In attaining these ends the actuating spring is made to perform these five functions: supporting the trap in upright operative position; carrying the pan, or trigger; holding pivotally the confining member for the choker bar; securing the choker bar in operative position, and actuating the trap. And a cross-piece carried by the spring serves the double function of supporting the trap against upset laterally and anchoring the bail.

Another important object is to provide such a trap, the force of action of which in choking small animals is less than that exerted upon much larger ones, thus at once minimizing the danger of damaging the tender skins of small creatures, and insuring the secure retention of the larger.

A further advantage in operation is attained in so constructing the device that greater force is applied to the initiation of the movement of the choker than is exerted subsequently, by which means the possibility of the escape of an animal by a quick movement before complete operation of the trap is reduced to a minimum.

Other objects and advantages may be apparent from the following description and the drawings, in which—

Figure 1 is a top view of the trap, Fig. 2 is a side view showing the trap set, Fig. 3 is a front view, Fig. 4 is a side view illustrating two stages in the movement of the trap after release, Fig. 5 is a similar view of the trap fully extended, Fig. 6 is a detail section of the choker and confining means.

Referring to the drawings, there is shown a trap comprising essentially but six members. These include the cross piece or foot 10 extending transversely of the trap, and a U-shaped yoke-jaw or bail 11, the extremities of which are suitably secured to the foot 10 adjacent respective ends thereof. One end of the actuating spring 12 is secured to the foot centrally thereof, the extremity 13' of the spring being extended upwardly adjacent the forward edge of the foot and recurved as at 13, an opening 14 being formed immediately adjacent the inner edge of the recurved portion to allow the engagement of the swivel finger 15 therethrough and around the adjacent recurved portion of the spring, which serves as a satisfactory pintle to support the finger, as shown.

The spring 12 is formed of a broad strap of metal of proper resiliency, its opposite major end portions being of similar form, which will be subsequently described in detail. The upper half 12′ of the spring carries pivotally the pan 16, having the downwardly extending ear 17 pivoted at its lower end between two ears 18 stamped up from the spring, the ear 17 having also the notch 19 adapted to receive the extremity of the finger 15 when extended inwardly over the choker bar. The extremity 20′ of the spring outwardly of the pan is curved inwardly, loosely encircling the choker bar 20, which, like the bail 11, may be formed of heavy wire. By this means the choker bar is held firmly in horizontal position throughout its movement. At each end of the bar 20 there is formed a large eye 21 loosely encircling respective sides of the bail 11 and allowing free movement of the choker bar throughout the length of the bail sides. The two arms of the spring are of nearly the same length. It will be observed that when the upper part of the spring is depressed the bar securing portion 20′ lies just within and below the recurved portion 13, so that the finger 15 may be extended inwardly thereover and engaged with the notch 19 of the trigger, the trap being thus held in set position, as illustrated in Figs. 2 and 6. When in set position, the upper end of the bail is disposed immediately over the center of the pan 16, so that when the pan is depressed by the fore foot of an animal approaching from either direction, the neck of such animal will be disposed immediately beneath the bight or horizontal upper portion 22 of the bail. It is true that an animal approaching the trap from a direction opposite the spring is likely to be caught behind the forelegs, or about the middle but the trap is especially effective in this operation, as will subsequently appear. The operative portions of the trap are also well adapted to be concealed, as the spring and setting mechanism may be readily covered with leaves or sand without interfering with their operation, and such covering is facilitated by the fact that these parts do not project upwardly to any great extent.

In order to more rapidly overcome the inertia of the moving parts when the trap is released, the opposite arms of the spring are each curved away from the other from a point intermediate of their lengths. This is done in order that their intermediate portions may abut while their extremities are still widely separated. In order to assure such abutment the arms are inset a very short distance from their rounded junction, as shown at 23, though this distance may be varied as found desirable. In this manner when the trap is being set, after the spring has been slightly compressed the inset portions come into contact, and as the curved portions outwardly thereof are brought together the force of the spring tending to open the trap is gradually increased toward the ends. Correspondingly the distensive force of the spring decreases as it opens.

There are three factors of force operative in the initial movement of the spring. One of these is the stress to which the metal at the junction of the arms of the spring is subjected, which tends to move them apart pivotally, their junction being the pivotal point. A second force is developed in the stress of the metal outward of the point of contact between the arms which also tends to produce a pivotal movement, the point of contact being the axial point, but as this point moves rapidly inward, the radius arc of such movement rapidly increases. This might seem likely to create binding between the bail and the eyes 21 of the choke bar, because the bail as illustrated curves gradually inward from the foot 10, but the large size of the eyes is believed to obviate this possibility, but it will be understood that if found desirable the arc of the bail may be varied at different parts of its length, as an obvious mechanical expedient. A third force is applied to the initial movement of the trap through the upward movement of the central portion of the lower arm of the spring, which bears upon the ground at its opposite ends, and produces a movement in the trap independently of the other forces mentioned, although it operates for but a short distance. This movement is suggested in the dotted lines of Fig. 4, which illustration also serves to show how contact is maintained between the arms during a large part of the movement of the choker bar.

It will be obvious from the foregoing that an extremely cheap and effective trap is provided, the number of parts being reduced to a minimum and its assemblage involving few operations.

The utilization of the spring itself to support the finger 15 and the choker bar adds largely to its simplicity, and the particular method of engagement of these parts makes the construction particularly efficient. It will be noted that by bending the extremity of the spring around the choker bar it is held without the use of rivets or other fastening means, and the choker is maintained in a firm horizontal position without lateral bracing or other additional structure for the purpose. Also if any slight sliding movement of the choker bar through the confining portion of the spring should be necessary, this is readily possible without impairing the efficiency of the device.

The trap is light, which is a desirable quality in this type of trap, as frequently a large number have to be carried considerable distances by trappers on foot, and it also occupies a very small amount of space.

What is claimed is:—

1. A trap comprising a stationary and a movable member, a spring having similar arms tending to diverge, one arm carrying the movable member and the other the stationary member, said arms being offset toward each other adjacent their junction, and being curved oppositely outward from each other for abutment of their intermediate portions at times and production of greater force in the initial movement of the trap than in the terminal movement thereof.

2. A trap comprising a foot piece, an upstanding bail carried thereby, a spring having divergent arms, one arm being secured to the foot piece and having its extremity upturned and recurved to provide a pivot axis, said upturned portion having an opening therethrough immediately adjacent the recurved portion, and a confining member engaged through the opening and pivotally around the recurved portion, the other of said arms carrying a choker bar adapted to coöperate with the bail, a trigger member carried by the last named arm and adapted to engage the confining member for release thereof upon operation of the trigger member.

3. A trap comprising a stationary portion including a bail, a choker bar having its ends slidably engaged with the bail, a spring of sheet metal having broad divergent arms, one of said arms being engaged with the stationary portion and the other having its end turned around the choker bar for movement therewith, a confining member carried by the stationary portion and a trigger member carried by the last named arm and adapted to engage the confining member for release thereof upon operation of the trigger.

4. A trap comprising a transverse member, a bail carried thereby, and having a rectilinear bight portion, a spring having broad divergent arms, one of said arms being secured to the stationary member and carrying a confining member, a choker bar having eye portions at opposite ends engaged slidably with respective sides of the bail, the other of said arms of the spring being bent around the bar for actuation and maintenance thereof in parallel with the bight of the bail and a trigger member carried by the last named arm and adapted for engagement with the confining member for release thereof upon operation of the trigger.

In testimony whereof I affix my signature in presence of two witnesses.

SANFIELD M. McDANIEL.

Witnesses:
C. C. CHAMBERLAIN,
CLAUDE BOLER.